United States Patent [19]

Anderson et al.

[11] Patent Number: 5,258,194
[45] Date of Patent: Nov. 2, 1993

[54] PROCESS FOR PREPARING A BROWNING COMPOSITION

[75] Inventors: James M. Anderson, Uncasville; Ping W. Chang, Waterford; Christopher A. Macri, Old Lyme; James W. Miller, Ledyard; Divina V. Sarges, Mystic, all of Conn.

[73] Assignee: Pfizer Inc., New York, N.Y.

[21] Appl. No.: 930,888

[22] Filed: Aug. 14, 1992

Related U.S. Application Data

[63] Continuation-in-part of Ser. No. 608,511, Nov. 5, 1990, Pat. No. 5,139,800.

[51] Int. Cl.$^5$ .................................................. A23L 1/00
[52] U.S. Cl. ...................................... 426/540; 426/250
[58] Field of Search ............... 426/540, 250, 262, 305, 426/307, 601

[56] References Cited

U.S. PATENT DOCUMENTS

| | | | |
|---|---|---|---|
| 3,483,002 | 12/1969 | Stein | 426/250 |
| 3,734,745 | 5/1973 | Cassanelli et al. | 426/540 |
| 4,759,936 | 7/1988 | Best et al. | 426/540 |
| 4,844,934 | 7/1989 | Lueddecke et al. | 426/540 |
| 5,002,789 | 3/1991 | Graf et al. | 426/540 |
| 5,023,095 | 6/1991 | Kirk | 426/250 |

*Primary Examiner*—George Yeung
*Attorney, Agent, or Firm*—Peter C. Richardson; Paul H. Ginsburg; Robert F. Sheyka

[57] ABSTRACT

A browning composition is prepared by mixing an oil phase containing an emulsifier with an aqueous phase containing a colorant under shear conditions to form a dispersion of the aqueous phase in the oil phase.

32 Claims, No Drawings

PROCESS FOR PREPARING A BROWNING COMPOSITION

This is a continuation-in-part of U.S. Ser. No. 608,511 filed Nov. 5, 1990, now U.S. Pat. No. 5,139,800.

BACKGROUND OF THE INVENTION

The present invention relates to a process for preparing a food browning composition. The composition may be used to brown foods cooked either by microwave radiation or by conventional means.

When foods are prepared quickly, particularly in those cases wherein the food is either cooked by microwave radiation or warmed for short period of time in a conventional oven or by other means, the surface of the food lacks the brown color and often the associated aroma produced by conventional cooking methods. The pale appearance of foods such as chicken, pork, beef and cakes is unappealing to consumers.

In the case of microwaved foods, browning has been achieved primarily by using packaging material containing metal susceptors for inducing local heating. These susceptors are in contact with the surface of the food and upon heating to a certain temperature, browning of the surface is accomplished. Such packaging is referred to in e.g. U.S. Pat. Nos. 4,833,007, 4,814,568, 4,626,641, 4,594,492, 4,590,349 and 4,555,605.

One approach to browning microwaved meat products such as poultry, beef, pork, fish and other foods has been to apply a brown-colored sauce or topping to the food before cooking or serving.

One such sauce is referred to in U.S. Pat. No. 4,252,832 to Moody. This is a thick syrup prepared by melting, caramelizing and foaming a granular disaccharide such as sucrose, maltose or lactose.

U.S. Pat. No. 4,640,837 to Coleman et al. refers to a coating composition for imparting a crisp golden brown surface to microwaved foods. The coating comprises a toasted bread crumb/oil blend in amounts up to 66 percent by weight of the composition, maltodextrin, soy protein concentrate and pre-gelatinized starch.

U.S. Pat. No. 4,518,618 to Hsia refers to a food coating composition comprising a combination of three salts, i.e. potassium acetate, potassium chloride and potassium bicarbonate or potassium acetate, potassium chloride and sodium bicarbonate.

U.S. Pat. No. 4,448,791 to Fulde refers to a reactive dough surface which undergoes chemical surface browning upon exposure to microwave radiation. The reactive composition contains as the essential active ingredients a reducing sugar such as dextrose and an amino acid source such as a yeast extract.

U.S. Pat. No. 4,735,812 to Bryson refers to a browning composition comprising collagen or gelatin hydrolyzed to its constituent amino acids plus one or more reducing sugars.

U.S. Pat. No. 4,882,184 to Buckholz refers to a microwave browning process comprising Maillard reaction precursors such as proline and rhamnose or ribose, and a solvent which is a mixture of glycerin and ethyl alcohol.

U.S. Pat. No. 4,904,490 to Buckholz refers to a microwave browning process comprising Maillard reaction precursors such as lysine and rhamnose or ribose, and a solvent which is a mixture of glycerin and ethyl alcohol.

SUMMARY OF THE INVENTION

In one embodiment, the present invention is directed to a process for the preparation of a browning composition comprising:

(a) preparing an oil phase by mixing an edible emulsifier with an edible fat or oil at a temperature sufficient to form a clear solution;

(b) maintaining the temperature of said oil phase above its cloud point;

(c) mixing said oil phase with an aqueous phase, said aqueous phase comprising a solution or dispersion of a colorant in an aqueous medium, the temperature of said aqueous phase being above the cloud point of said oil phase;

(d) subjecting the resulting mixture to high shear to form a solution or dispersion of said aqueous phase in said oil phase.

Preferred also is the process wherein said colorant is selected from the group consisting of caramel, paprika, food grade dyes, beet powder, carmine, water-soluble annatto, turmeric, and saffron; and combinations thereof; with an especially preferred colorant being caramel.

Also preferred is the process wherein said fat or oil is present at a concentration of from about 10 to about 99 percent by weight, preferably at from about 40 to about 70 percent by weight.

Especially preferred is the process wherein said fat or oil is selected from the group consisting of canola oil, soybean oil, corn oil, olive oil, peanut oil, safflower oil, sunflower oil, vegetable oil, partially hydrogenated vegetable oils, animal fats, and milkfat; and combinations thereof; with preferred oils being canola oil and soybean oil.

Preferred is the process wherein the emulsifier is selected from the group consisting of mono- and diglycerides and diacetyltartaric acid esters of mono- and diglycerides; and combinations thereof; with said emulsifier present at a concentration of from about 0.1 to about 10 percent, preferably at from about 1 to about 8 percent.

Also further preferred is the process further comprising the addition of a viscosifying agent, with the viscosifying agent present at a concentration of from about 0.01 to about 1 percent by weight, preferably at from about 0.05 to about 0.4 percent by weight.

Preferred viscosifying agents are selected from the group consisting of xanthan gum, guar gum, starch, flour, gelatin, pectin, agar, carrageenan, alginates, locust bean gum, methyl cellulose, hydroxypropyl cellulose, hydroxypropylmethyl cellulose, carboxymethyl cellulose, ethyl cellulose, and methylethyl cellulose; and combinations thereof; with especially preferred viscosifying agents being xanthan gum, guar gum, and starch.

Still further preferred is the process further comprising the addition of a film-forming agent, with said film-forming agent present at a concentration of from about 0.01 to about 1.0 percent by weight, preferably at from about 0.05 to about 0.4 percent by weight.

Preferred film-forming agents are selected from the group consisting of hydroxypropyl cellulose, methyl cellulose, arabinogalactan, hydroxypropylmethyl cellulose, ethyl cellulose, carboxymethyl cellulose, and zein; and combinations thereof; with especially preferred film forming agents being hydroxypropyl cellulose and methyl cellulose.

Also further preferred is the process further comprising the addition of an oil-soluble colorant, with said colorant present at a concentration of from about 0.01 to about 2 percent of said composition. Preferred oil-soluble colorants are β-carotene, oil soluble annatto and paprika oleoresin.

Preferred temperatures at which the process of the present invention may be carried out are from about 35° C. to about 70° C. with a preferred temperature being 40° C.

Preferred conditions of high shear are those carried out in a blender.

DETAILED DESCRIPTION OF THE INVENTION

In one embodiment, the present invention is directed to a process for the preparation of an edible composition for imparting a brown color to foods cooked by microwave radiation or by conventional means. The composition will not substantially alter the color of the food surface before cooking, and upon microwaving or heating by conventional means, a brown color is developed. The process results in a composition wherein initial brown color is disguised by the use of a carrier. Upon cooking, the composition releases the desired color. Thus, the composition releases the desired color. Thus, the composition when applied does not substantially alter the surface color before cooking.

The composition comprises a dispersed phase containing the colorant and a continuous phase consisting essentially of a fat or oil.

The dispersed phase consists essentially of a colorant or a colorant substantially dissolved or dispersed in a substantially oil-immiscible medium. In those cases where the colorant is a liquid, it either by itself or dissolved in the substantially oil-immiscible medium will constitute the dispersed phase. In those instances where the colorant is a solid, it may be dispersed directly in the fat or oil comprising the continuous phase of the composition. Alternatively, it may be dissolved or dispersed in the substantially oil-immiscible medium which is itself dispersed in the continuous phase.

By the term "substantially oil-immiscible medium" is meant a medium which is substantially insoluble in the fat or oil which forms the continuous phase of the composition, and forms a separate phase dispersed in said fat or oil. It will be appreciated by those skilled in the art that said medium and said fat or oil can have a low degree of mutual solubility and still form a multiphase system. A preferred oil-immiscible medium is water.

In the process of the present invention, the colorant may be present at a concentration of from about 0.05 to about 10 percent by weight, preferably from about 0.2 to about 10 percent by weight.

The process for producing the composition uses an edible colorant which is chosen so that upon cooking, the desired color, preferably a shade of orange, red, yellow, or brown, is achieved. Examples of colorants which fulfill this criterion are caramel, paprika, food grade dyes, beet powder, carmine, water soluble annatto, tumeric, and saffron. Combinations of the above colorants may also be used. An especially preferred colorant is caramel. All these colorants are commercially available.

It will be appreciated by those skilled in the art to which this invention applies that some colorants, while substantially insoluble in the oil or fat which comprises the continuous phase of the present composition, contain oil-soluble components which may impart a color to said oil or fat phase. The resulting composition will impart a color to the uncooked food to which it is applied. Although less intense than the brown color which develops upon cooking, this visible color may be desirable since it may enhance the natural color of the uncooked food. In fact, in some cases such as when the uncooked food has an unappealing pale color, it has been found useful to add an oil-soluble colorant to the composition of the present invention.

In these cases wherein the oil-soluble colorant is used, it is present at a concentration of from about 0.01 to about 2 percent of the composition of the present invention. Examples of oil-soluble colorants are paprika oleoresin, β-carotene nd oil-soluble annatto. Combinations of the above colorants may also be used.

The fat or oil used in the process of the present invention to produce the continuous phase of the composition of the present invention can be any edible fat or oil. The edible fat or oil may be present at from about 10 to about 99 percent by weight, preferably at from about 40 to about 70 percent by weight. Non-limiting examples of preferred fats or oils which may be used are canola oil, soybean oil, corn oil, olive oil, peanut oil, safflower oil, sunflower oil, vegetable oil, partially hydrogenated vegetable oils, animal fats, and milkfats. Combinations of the above fats or oils may also be used. Preferred fats or oils are canola oil and soybean oil.

An emulsifier is also used in the process of the present invention. Preferred emulsifiers are mono- and diglycerides and diacetyltartaric acid esters of mono- and diglycerides. The emulsifier is preferably present at a concentration of from about 0.5 to about 10 percent, preferably at from about 1 to 8 percent. Combinations of the above emulsifiers may also be used.

To impart further viscosity, if desired, to the composition, a viscosifying agent, at a concentration of from about 0.01 to about 1 percent by weight, preferably from about 0.05 to about 0.4 percent by weight, may also be added to the composition prepared by the process of the present invention. Preferred viscosifying agents are xanthan gum, guar gum, starch, flour, gelatin, pectin, agar, carrageenan, alginates, locust bean gum, methyl cellulose, hydroxypropyl cellulose, hydroxypropylmethyl cellulose, carboxymethyl cellulose, ethyl cellulose, and methylethyl cellulose; and combinations thereof. Especially preferred viscosifying agents are xanthan gum, guar gum, and starch.

In some cases, a film-forming agent may be added to the composition prepared by the process of the present invention. While not wishing to be bound by theory, it is believed that the film-forming agent enhances adhesion of the compositions to foods and/or allows for adjustment of luster and moisture of the cooked foods. Those skilled in the art to which this invention applies will appreciate that some viscosifying agents also have a film-forming function. One skilled in the art would further appreciate that these functions may be balanced by routine procedures, e.g. adjustment of concentrations. If added, the film-forming agent is present at a concentration of from about 0.01 to about 1.0 percent by weight, preferably at from about 0.01 to about 1.0 percent by weight, preferably at from about 0.05 to about 0.4 percent by weight. Preferred film-forming agents are hydroxypropyl cellulose, methyl cellulose, arabinogalactan, hydroxypropyl methyl cellulose, ethyl cellulose, carboxymethyl cellulose and zein. Combinations of the above may also be used.

The heating steps of the present invention may be carried out at a temperature of from about 35° C. to about 50° C., preferably about 40° C. The conditions of shear may be accomplished in a blender.

The composition prepared by the process of the present invention may be used on a variety of foodstuffs. Non-limiting examples of foodstuffs include poultry, baked goods, pork, fish, beef, cheeses, fruits, vegetables, pasta and marshmallows.

While the composition prepared by the process of the present invention is especially suitable for imparting a brown color to foods cooked by microwave radiation, it has also surprisingly been found that it can be used on foods cooked by conventional means. For instance, the composition may be applied to frozen TV dinners or pot pies and when these frozen dinners or pot pies are heated in a conventional oven, for example, a desirable brown color is achieved without overbrowning.

The invention having been described in general terms, reference is now made to specific Examples. It is to be understood that these Examples are not meant to limit the present invention, the scope of which is determined by the appended claims.

EXAMPLE 1

A mixture of 100 grams of a 1% aqueous solution of Keltrol (Kelco Division of Merck and Co. xanthan gum), 430 grams of water, and 30 grams of Sethness RT #175 caramel powder was stirred until homogenous and heated to about 40° C. A solution of emulsifier in oil was prepared by heating 2150 grams of canola oil to about 70° C. and adding 50 grams of Panodan 150 emulsifier (Grindsted Products, Inc.) with stirring. A 440-gram portion of the resulting solution was transferred to a blender, the temperature was adjusted to about 40° C., the 40° C. caramel solution was added while stirring at medium speed, and the resulting mixture was stirred for 3 minutes at high speed.

EXAMPLE 2

A mixture of 170.5 grams of a 1% aqueous solution of Keltrol (Kelco Division of Merck and Co. xanthan gum), 732 grams of water, and 51 grams of Sethness RT #175 caramel powder at 40° C. was stirred until homogeneous. A solution of emulsifier in oil was prepared by heating 2150 grams of canola oil to about 70° C. and adding 50 grams of Panodan 150 emulsifier (Grindsted Products, Inc.) with stirring. A 750-gram portion of the resulting solution, maintained at 40° C., was added with stirring to 40° C. caramel solution during 1 minute, stirring was continued for 3 minutes, and the resulting emulsion was cooled to room temperature, adjusted to pH 3.4-3.5 with 85.8% phosphoric acid, and subjected to high shear by passage through a Gaulin laboratory homogenizer at 1500 pounds per square inch pressure.

We claim:

1. A process for the preparation of a browning composition comprising:
   (a) preparing an oil phase by mixing an edible emulsifier with an edible fat or oil at a temperature sufficient to form a clear solution;
   (b) maintaining the temperature of said oil phase above its cloud point;
   (c) mixing said oil phase with an aqueous phase, said aqueous phase comprising a solution or dispersion of a colorant in an aqueous medium, the temperature of said aqueous phase being above the cloud point of said oil phase;
   (d) subjecting the resulting mixture to high shear to form a solution or dispersion of said aqueous phase in said oil phase.

2. A process according to claim 1 wherein said colorant is present at a concentration of from about 0.05 to about 10 percent by weight.

3. A process according to claim 2 wherein said colorant is present at a concentration of from about 0.2 to about 6 percent by weight.

4. A process according to claim 1 wherein said colorant is selected from the group consisting of caramel, paprika, food grade dyes, beet powder, carmine, water-soluble annatto, turmeric, and saffron; and combinations thereof.

5. A process according to claim 4 wherein said colorant is caramel.

6. A process according to claim 1 wherein said fat or oil is present at a concentration of from about 10 to about 99 percent by weight.

7. A process according to claim 6 wherein said fat or oil is present at a concentration of from about 40 to about 70 percent by weight.

8. A process according to claim 1 wherein said fat or oil is selected from the group consisting of canola oil, soybean oil, corn oil, olive oil, peanut oil, safflower oil, sunflower oil, vegetable oil, partially hydrogenated vegetable oils, animal fats, and milkfat; and combinations thereof.

9. A process according to claim 8 wherein said fat or oil is canola oil.

10. A process according to claim 8 wherein said fat or oil is soybean oil.

11. A process according to claim 1 wherein said emulsifier is present at a concentration of from about 0.1 to about 10 percent by weight.

12. A process according to claim 11 wherein said emulsifier is present at from about 1 to about 8 percent by weight.

13. A process according to claim 1 wherein said emulsifier is selected from the group consisting of mono- and diglycerides, and diacetyltartaric acid esters of mono- and diglycerides; and combinations thereof.

14. A process according to claim 1 further comprising the addition of a viscosifying agent.

15. A process according to claim 14 wherein said viscosifying agent is present at a concentration of from about 0.01 to about 1 percent by weight.

16. A process according to claim 15 wherein said viscosifying agent is present at a concentration of from about 0.05 to about 0.4 percent by weight.

17. A process according to claim 14 wherein said viscosifying agent is selected from the group consisting of xanthan gum, guar gum, starch, flour, gelatin, pectin, agar, carrageenan, alginates, locust bean gum, methyl cellulose, hydroxypropyl cellulose, carboxymethyl cellulose, ethyl cellulose and methylethyl cellulose; and combinations thereof.

18. A process according to claim 17 wherein said viscosifying agent is xanthan gum.

19. A process according to claim 17 wherein said viscosifying agent is guar gum.

20. A process according to claim 17 wherein said viscosifying agent is starch.

21. A process according to claim 1 further comprising the addition of a film-forming agent.

22. A process according to claim 21 wherein said film-forming agent is present at a concentration of from about 0.01 to about 1 percent by weight.

23. A process according to claim 22 wherein said film-forming agent is present at a concentration of from about 0.05 to about 0.4 percent by weight.

24. A process according to claim 21 wherein said film-forming agent is selected from the group consisting of hydroxypropyl cellulose, methyl cellulose, arabinogalactan, hydroxypropylmethyl cellulose, ethyl cellulose, carboxymethyl cellulose, and zein; and combinations thereof.

25. A process according to claim 24 wherein said film-forming agent is hydroxypropyl cellulose.

26. A process according to claim 24 wherein said film-forming agent is methyl cellulose.

27. A process according to claim 1 further comprising the addition of an oil-soluble colorant.

28. A process according to claim 27 wherein said colorant is present at a concentration of from about 0.01 to about 2 percent of said composition.

29. A process according to claim 27 wherein said oil-soluble colorant is selected from the group consisting of paprika oleoresin, $\beta$-carotene and oil-soluble annatto; and combinations thereof.

30. A process according to claim 1 wherein the temperature of steps (a), (b) and (c) is from about 35° C. to about 70° C.

31. A process according to claim 30 wherein said temperature is about 40° C.

32. A process according to claim 1 wherein said shear conditions of step (d) are generated in a blender.

* * * * *